United States Patent Office 2,695,877
Patented Nov. 30, 1954

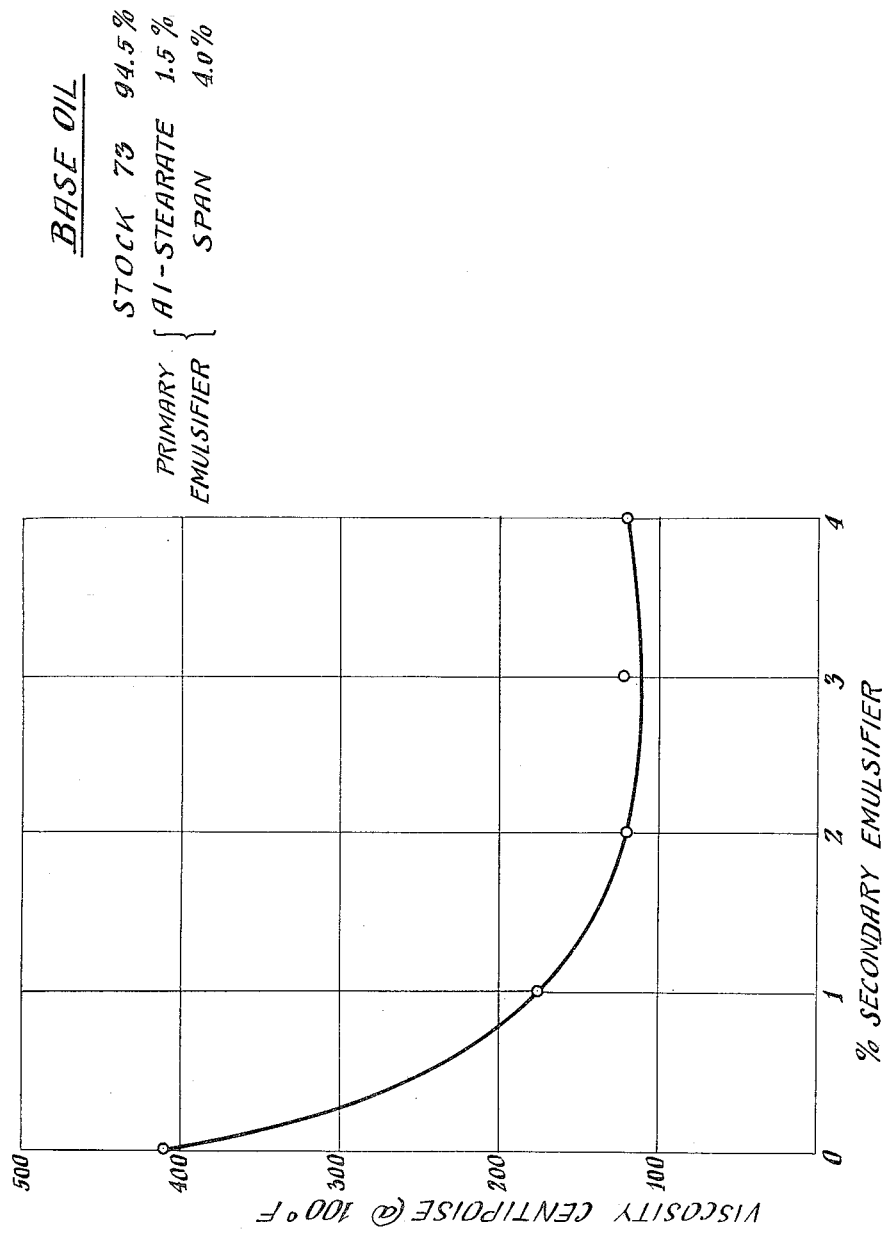

2,695,877
WATER-IN-OIL SOLUBLE OIL

Clayton W. Nichols, Jr., Mineola, and Harold J. Schroeder, Brooklyn, N. Y., assignors to Socony-Vacuum Oil Company, Incorporated, a corporation of New York Application March 1, 1950, Serial No. 146,948

4 Claims. (Cl. 252—37.2)

The present invention relates to soluble oils and, more particularly, to soluble oils suitable for use both as lubricant and coolant in the rolling of metal.

It has long been the goal of lubricant manufacturers to supply to the metal rolling mills a lubricant which likewise had the desirable physical characteristics of a coolant. Such a lubricant would satisfy a need in the metal rolling industry for at least two reasons. First, when an oil is used for lubrication and water is used as a coolant, the two inevitably at some time mix through leaks in one system or the other, through carelessness or because of some other unavoidable cause. Secondly, there is at least one high speed mill which because of design requires that the lubricant be the coolant.

When approaching this problem it must be remembered that the efficiency of a coolant is dependent upon its specific heat; i. e., the amount of heat energy required to raise the temperature of a unit weight of the material one degree at temperatures below the vaporization temperature. While mineral oil is an excellent lubricant, it is a poor coolant as compared to water because the specific heat of mineral oil is only about 0.5 that of water. On the other hand, it is well-known that except under special conditions water is not a good lubricant. Thus, the art has been confronted with this problem ever since the inception of metal rolling and particularly since the development of high speed rolling.

It is axiomatic that the reduction in thickness of a piece of metal is accompanied by the generation of heat. It is also manifest that the heat so generated must be dissipated by some means. Under many conditions the heat so generated can be absorbed by water but in other circumstances such is not possible.

In recent years high speed rolling of accurately sized strip has been achieved in the Sendzimir mill. However, this mill requires that the lubricant also be the coolant. Consequently, the Sendzimir mill typifies the problem confronting the manufacturer of lubricants.

The solution of the problem of providing a coolant-lubricant for use under conditions such as are typified by the Sendzimir mill is not solely dependent upon providing a lubricant with a specific heat approaching as closely as possible that of water. It is also necessary to provide a material having a viscosity suitable for the use to which it is to be put. In other words, a satisfactory coolant-lubricant must have a controlled viscosity.

Several coolant-lubricants have been offered to the metal rolling industry but have been unsatisfactory for one reason or another. Thus, for example, many emulsions have failed to be satisfactory because the viscosities thereof were too low.

It has now been discovered that a satisfactory coolant-lubricant having a controlled viscosity and a specific heat appreciably greater than that of mineral lubricating oil can be produced.

It is an object of the present invention to provide a coolant-lubricant having a controlled viscosity.

It is another object of the present invention to provide a coolant-lubricant having a controlled viscosity between about 100 Saybolt Seconds Universal and about 11,000 Saybolt Seconds Universal at 100° F.

It is a further object of the present invention to provide a coolant-lubricant comprising a lubricating fraction of mineral oil, water, a primary emulsifier and a secondary emulsifier.

Other objects and advantages will become apparent from the following description:

The heat-absorbing capacity of the novel, controlled-viscosity, coolant-lubricant is approximately 50 per cent greater than that of mineral oil and a 50 per cent water emulsion has a specific heat of 0.74. The stability of the novel, controlled-viscosity, coolant-lubricant is excellent even at pressures of 5,000 pounds per square inch. The evaporation of water from the novel, controlled-viscosity, coolant-lubricant is at a much lower rate than the evaporation of water from prior art conventional soluble oil emulsions of the oil-in-water type. Emulsions of the base stock and water are readily formed without the use of special equipment such as colloid mills, homogenizers and the like.

The base stock of the coolant-lubricant comprises a major proportion of mineral oil. Since the viscosity of the coolant-lubricant is to some extent dependent upon the viscosity of the fraction of mineral oil employed, the mineral oil shall have a viscosity of about 40 to about 900 Saybolt Seconds Universal at 100° F. In addition to the mineral oil, the base stock comprises a minor proportion of one or more anti-wear and anti-rust agents, a minor proportion of one or more film-strength improvers, a controlled amount of one or more primary (water-in-oil) emulsifiers and a controlled amount of one or more secondary (oil-in-water) emulsifiers.

For example, a base stock can be compounded in accordance with the following formulation:

| Ingredient | Function | Percent by Weight |
|---|---|---|
| Neutral Degras | Anti-wear and anti-rust | 5.0 |
| Di (glycol mono-oleate) malate | do | 1.0 |
| Oleyl acid phosphate | Film strength improver | 0.5 |
| Chlorinated hydrocarbon (42% Cl) | do | 2.5 |
| Aluminum Stearate | Primary Emulsifier | 1.5 |
| Fatty acid ester of a hexitol anhydride, said fatty acid having at least 6 carbon atoms | do | 2.0 |
| Polyoxyalkylene derivative of a fatty acid ester of a hexitol anhydride, said fatty acid having at least 6 carbon atoms | Secondary Emulsifier | 2.0 |
| 100″ Pale Paraffin Oil | | 85.5 |
| | | 100.0 |

Gravity of Base Stock, ° API _____ 23.9.
S. U. Viscosity of Base Stock at 100° F __ 157 seconds.
Color ASTM _____ 2½.
Stability _____ Stable to freezing and thawing.

Characteristics of 50% emulsion with water of the aforedescribed base stock:
 Specific Heat _____ 0.74.
 S. U. Viscosity at 100° F _____ 600 seconds.
 Emulsion Stability _____ Slight oil separation in two weeks.

The following base blends are illustrative of the effect of various type emulsifiers on the viscosity of the resulting emulsion:

| | Base Oil | |
|---|---|---|
| | A | B |
| 42/45″ Pale Paraffin Oil | 90.5 | 90.5 |
| Oleic Acid | 5.0 | 5.0 |
| Primary Emulsifier [1] (Water-in-Oil) | | 0.8 |
| Secondary Emulsifier [2] (Oil-in-Water) | 2.0 | |

[1] For example, 1-hydroxyethyl-2-heptadecenyl glyoxalidine (Amine 220).
[2] For example, polyoxyalkylene derivative described in column 2.

As has been emphasized hereinbefore, the viscosity of the water emulsion prepared from the novel base stock can be controlled within the limits of about 100 to about 11,000 seconds Saybolt Universal at 100° F. That is to say, the concentration of the secondary emulsifier controls the viscosity of the emulsion prepared from the charge stock. This is clearly illustrated by the following data:

| Blend | Viscosity at 100° F. S. S. U. of 4:1 emulsion of the Base Oil |
|---|---|
| 99.1% Base Oil A.[1]+0.9% primary emulsifier A [2] | 1,150 |
| 98.5% Base Oil A+1.5% primary emulsifier A | 2,500 |
| 97.5% Base Oil A+2.5% primary emulsifier A | 2,770 |
| 98.5% Base Oil B [3] + 1.5% secondary emulsifier [4] | 1,960 |
| 97.5% Base Oil B + 2.5% secondary emulsifier | 950 |

[1] Containing 2% of secondary emulsifier.
[2] 1-hydroxyethyl-2-heptacedenylglyoxalidine.
[3] Containing 0.8% primary emulsifier.
[4] Polyoxyalkylene derivative described in column 2.

Those skilled in the art will recognize that the foregoing blends of base oil A with 0.9 per cent to 2.5 per cent primary emulsifier and of base oil B with 1.5 per cent to 2.5 per cent secondary emulsifier provide emulsifiable oils containing, when base oil A is used, about 0.9 per cent–about 2.5 per cent primary emulsifier, about 2 per cent secondary emulsifier, about 5 per cent oleic acid and the balance mineral oil and, when base oil B is employed, about 0.8 per cent primary emulsifier, about 1.5 per cent to about 2.5 per cent secondary emulsifier, about 5 per cent oleic acid and the balance mineral oil. Therefore it is manifest that these blends contain in general about 0.8 per cent to about 2.5 per cent primary emulsifier, about 1.5 per cent to about 2.5 per cent secondary emulsifier, about 5 per cent oleic acid and the balance mineral oil, the concentration of secondary emulsifier being controlled to produce a soluble oil blend capable when diluted of providing a lubricant coolant of controlled viscosity.

The soluble oils (base oils) when emulsified with an equal amount of water have lubricating properties approaching those of lubricating oils. This has been established by wear tests in heavily loaded anti-friction bearings and in Vickers' vane type pumps.

The anti-rust properties of 50 per cent emulsions of these base oils are markedly superior to those of the conventional soluble oil emulsions of the oil-in-water type. In fact, the rust preventive properties of such emulsions are classified as good.

The stability of 50 per cent emulsions of these novel base oils is excellent even at pressures of 5,000 pounds per square inch (p. s. i.) under very close clearance conditions as in bearings or high pressure pumps. Although a very slight amounts of oil may separate as a "cuff" after the emulsions remain in a quiescent state for several weeks, it is readily re-emulsified when the oil is simply agitated. This is in contrast to the difficulty encountered when attempting to re-emulsify conventional oil-in-water emulsions.

Whereas the viscosity of conventional oil-in-water emulsions cannot be controlled by soluble oil, i. e., base oil, composition, the viscosity of the emulsions of the present novel base oils can be controlled over a broad range by modification of the formulation of the base oil as demonstrated hereinbefore and/or the viscosity of the mineral oil base.

The lubrication properties of the novel soluble-oil emulsions were determined in comparison with several prior art soluble oils and a straight mineral lubricating oil available to the trade.

SKF double row, tapered roller bearings were run at 100 per cent rated load (860 pounds) at 1750 R. P. M. for 400 hours in the S. G. O. L. test machine described hereinafter. Under these test conditions soluble oils A, B and C failed rapidly, whereas the novel soluble oils gave excellent results. A conventional lubricating oil was also tested. While the conventional lubricating oil provides satisfactory lubrication, it is unsatisfactory for use in high speed mills such as the Sendzimir mills because of its inability to carry away efficiently the heat generated during the rolling operation. Consequently, non-uniform sheets result. Conventional soluble oils dissipate the heat, but frequent bearing failures occur as has been demonstrated by these tests.

The SGOL machine is esentially a vertically loaded horizontal shaft which in turn rests on two replaceable roller bearings which are supplied with the lubricant under test. Lubricant performance characteristics are evaluated by roller bearing weight loss and by bearing appearance at the termination of a test run.

Two weighted lever arms rest on heavy duty roller bearings situated near the middle of the shaft. In the present tests a new roller bearing assembly was used with each test lubricant. The lubricants were evaluated at a load of 860 pounds per bearing and a shaft speed of 1750 R. P. M. One gallon of test lubricant was used for each bearing and the lubricant was circulated from a lubricant sump by means of a positive displacement rotary pump.

Inspection of bearing races for spalling, pitting, rusting and similar visually determined evidence of the satisfactory or unsatisfactory properties of the test lubricants was also made.

The conditions and results of the aforedescribed comparative tests are presented in Table I.

TABLE I

SKF bearings at 1,750 R. P. M.:
Rated load _____ 860 p. s. i.
Test load _____ 860 p. s. i.
Duration of test—400 hours.

| Lubricant | Emulsion Concentration | Condition of Bearing at conclusion of Tests |
|---|---|---|
| Conventional Lubricating Oil | | Excellent, no spalling. |
| Soluble Oil A | 1:6 | Slight spalling of rollers. |
| Soluble Oil B | 1:6 | Spalling on outer race. |
| Soluble Oil C | 1:6 | Severe spalling on both rollers and outer race. |
| Novel soluble oil | 1:1 | Excellent, no spalling. |

It will be noted that the lubricating properties of the novel soluble oil are comparable to those of lubricating oil.

To further test the lubricating properties of the novel soluble oils and to test the stability of the emulsions made therefrom under high pressures, the novel soluble oils were subjected to the "Vickers' Hydraulic Pump Test" described in Lubrication Engineering, J. A. S. L. E., vol. 5, No. 1, February 1949, pages 16 and 17.

Briefly, the test equipment and the conditions of the test are as follows:

The unit consists of a vane type pump, directly connected to a 3 H. P. electric motor. The oil reservoir is mounted on the same table with the motor and pump, and the oil strainer is attached to the oil intake line in the reservoir. Operating pressure is controlled by a relief valve which is fitted into the pressure line from the pump. The oil at low pressure returns to the reservoir through a flow meter. Operating temperatures of the hydraulic fluid are controlled by means of an automatic electrothermo regulator and a water cooling coil.

The standard procedure for conducting a run involves circulating the oil at a temperature of 175° F. under a pump pressure of 1000 p. s. i. for a period of 1000 hours. In beginning the test, the machine is completely disassembled and all parts and lines are thoroughly cleaned. A complete set of new pump parts; i. e., rotor, ring, bronze bushings and weighed vanes, is installed and the system is thoroughly flushed with new heated oil. The unit is given a break-in run which is continued until a steady flow rate of about 1.3 gallons per minute is attained. After draining the break-in charge, three gallons of test oil are then introduced into the system and the test is started. A two ounce sample of the oil is removed at intervals of 100 hours for physical and chemical tests, and the pump is opened for inspection every 250 hours. At the completion of the run, the vanes are again weighed to determine metal loss due to wear. The pump parts and the entire system are inspected for evidence of corrosion and the presence of deposits.

The results of testing a light lubricating oil, a conventional soluble oil and a novel soluble oil are presented in Table II.

TABLE II

| Product | Pressure, p. s. i. | Temperature, °F. | Hours Run | Vane Wear, Percent | Ring Wear, Percent | Flow Rate, G.P.M. |
|---|---|---|---|---|---|---|
| Light Lube Oil | 1,000 | 175 | 1,000 | 3.15 | 3.3 | 1.4 |
| Prior Art Soluble Oil | 500 | 130 | 109 | 0.89 | 0.01 | 0.35 |
|  | 200 | 130 | 1,000 | 1.6 | 0.04 | 1.8 |
|  | 1,000 | (¹) | (¹) | (¹) | (¹) | (¹) |
| Novel Soluble Oil | 200 | 140 | 289 | 0.2 | 0.4 | 2.4 |
|  | 1,000 | 170 | 185 | 1.5 | 0.41 | 2.2 |

¹ Pump inoperable at this pressure.

The data presented in Table II establish that the novel soluble oil approaches light lube oil in anti-wear properties and is superior to conventional prior art soluble oils.

The novel soluble oils were subjected to the well-known Falex wear test in comparison with a light lubricating oil and prior art soluble oils. The data thus obtained are presented in Table III.

TABLE III

*Falex wear test—Steel pins and steel bushings at 290 R. P. M.*

15 minute break-in period ag 50 pounds load.
60 minute wear period at 200 pounds load.

| Product | Emulsion Concentration | Weight Loss in Milligrams |
|---|---|---|
| Light Lube Oil |  | 4.1 |
| Soluble Oil A | 1:1 | 15.2 |
|  | 1:6 | 13.6 |
| Soluble Oil B | 1:1 | 21.0 |
|  | 1:6 | 14.9 |
| Novel Soluble Oil (cont'g. 60″ Mineral Oil) | 1:1 | 9.3 |
| Novel Soluble Oil (cont'g. 100″ Mineral Oil) | 1:1 | 5.0 |
| Novel Soluble Oil (without anti-wear and film-strength additives cont'g. 100″ mineral oil) | 1:1 | 9.8 |

It is apparent after consideration of the foregoing data that the novel soluble oil containing 100″ mineral oil and anti-wear and film-strength additives is substantially equivalent in 1:1 emulsion to light lubricating oil. It is also apparent that the novel soluble oil is far superior to the prior art soluble oils A and B at the same concentration; i. e., 1:1 emulsion. It will also be noted that at higher dilutions; i. e., 1:6 of the prior art soluble oils some improvement is attained. However, it is likely that this improvement is due to the greater cooling effect at the higher dilution.

The specific heat, and consequently the ability to cool, varies linearly with the concentration of water in the emulsion. Thus, the mineral oil from which the novel soluble oils were prepared had a specific heat of 0.48; a 1:1 emulsion of the novel soluble oil had a specific heat of 0.74; an emulsion containing 85 per cent water had a specific heat of 0.935±0.015.

The control of the viscosity of water-in-oil emulsions of the novel soluble oils can be exercised in three ways. The simplest method is by controlling the amount of water. The maximum amount of water which can be added to or emulsified in the novel soluble oils is slightly less than 70 per cent. When 70 per cent or more water is added to the novel soluble oils, the emulsion breaks and separates into two or more phases.

A second means of controlling the viscosity of water-in-oil emulsions is by using base oils of greater or less viscosity. On the other hand, increasing the viscosity of the oil in oil-in-water emulsions causes no appreciable increase in the viscosity of the emulsion.

The third method controlling the viscosity of the novel water-in-oil emulsions is by the use of secondary emulsifiers. It is preferred to control the viscosity of the novel water-in-oil emulsions by the use of base oils of greater or less viscosity and by regulation of the secondary emulsifier and the concentration thereof as discussed hereinbefore.

For example, the effect of the concentration of the secondary emulsifier upon the viscosity of 1:1 water-in-oil emulsion is well illustrated by the curve of the drawing. The base oil contained 94.5 weight per cent of 58/60 seconds S. U. V. @ 100° F. mineral oil, 1.5 weight per cent of one primary emulsifier (aluminum stearate) and 4.0 weight per cent of a second primary emulsifier (a fatty acid ester of a hexitol anhydride, the fatty acid of which has at least six carbon atoms; to wit, "Span 80"). The concentration of the secondary emulsifier; i. e., the oil-in-water emulsifier (polyoxyalkylene derivative of a fatty acid ester of a hexitol anhydride in which the fatty acid has at least six carbon atoms; to wit, "Tween 81") was varied between 0 and 4 weight per cent. As the graph illustrates, the viscosity varied between 400 and 100 centipoise at 100° F. with the increase in concentration of the secondary emulsifier up to 2 weight per cent.

In view of the foregoing discussion, it is apparent that the present invention provides a soluble oil capable of dilution with up to about 69 weight per cent water and comprising a major proportion of mineral oil of lubricating grade, a minor proportion of at least one material effective to inhibit wear and rust, a minor proportion of at least one material effective to increase the film strength of the soluble oil, a minor proportion of at least one primary water-in-oil emulsifier and sufficient of at least one secondary oil-in-water emulsifier to provide a soluble oil emulsion having the desired viscosity between about 100 and about 11,000 seconds, Saybolt Universal at 100° F.

It is to be understood that the specific anti-rust, anti-wear, film-strength improvers, primary emulsifiers and secondary emulsifiers specifically named hereinbefore are only exemplary of the named classes of materials well-known to those skilled in the art. Accordingly, the novel soluble oils are compounded in accordance with the following formulation:

| Ingredient | Weight Percent | Preferred Weight Percent |
|---|---|---|
| One or more anti-wear and anti-rust materials.¹ | 0.5 to 15.0 | 6.0. |
| One or more film-strength improvers. | 0.25 to 5.0 | 3.0. |
| One or more secondary emulsifiers (oil-in-water). | Up to 10 ² | 3.5. |
| One or more primary emulsifiers (water-in-oil). | 0.5 to 10 | 2.0. |
| Mineral Oil (SUV. 40″ to 900″ @ 100° F.). | Balance to make 100%. | Balance to make 100%. |

¹ Anti-wear material and an anti-rust material can be substituted for material capable of performing both functions.
² Sufficient secondary emulsifier is employed to produce the required viscosity.

We claim:

1. A soluble oil comprising: about 5 per cent by weight of neutral degras; about 1 per cent by weight of di(glycolmonooleate) malate; about 0.5 per cent by weight of oleyl acid phosphate; about 2.5 per cent by weight of chlorinated hydrocarbon having a chlorine content of 42 per cent by weight; and 1.5 per cent by weight of aluminum stearate; about 2 per cent by weight of a fatty acid ester of a hexitol anhydride, said fatty acid having at least six carbon atoms; about 2 per cent by weight of a polyoxyalkylene derivative of a fatty acid ester of a hexitol anhydride, said fatty acid having at least six carbon atoms; and the balance, to make 100 per cent, mineral lubricating oil.

2. A soluble oil comprising: about 5 per cent by weight of neutral degras; about 1 per cent by weight of di(glycolmonooleate) malate; about 0.5 per cent by weight of oleyl acid phosphate; about 2.5 per cent by weight of chlorinated hydrocarbon having a chlorine content of 42 per cent by weight; about 1.5 per cent by weight of aluminum stearate; about 2 per cent by weight of sorbitan monooleate; a minor proportion of a polyoxyethylene sorbitan monooleate; and the balance, to make 100 per cent, mineral lubricating oil; said soluble oil containing an amount of said polyoxyethylene sorbitan monooleate which, when said soluble oil is diluted with water to provide an emulsion containing not more than about 69 per cent by weight of water, is correlated with and effective to produce a lubricant-coolant having a required viscosity.

3. The soluble oil defined by claim 1 wherein the lubricating oil is one having a Saybolt Universal Viscosity of 100 seconds at 100° F.

4. The soluble oil defined by claim 1 wherein the lubricating oil is one having a Saybolt Universal Viscosity of 60 seconds at 100° F.

References Cited in the file of this patent

UNITED STATES PATENTS

| Number | Name | Date |
|---|---|---|
| 2,182,992 | Lebo | Dec. 12, 1939 |
| 2,296,037 | Kaufman | Sept. 15, 1942 |
| 2,431,008 | Wright | Nov. 18, 1947 |
| 2,443,579 | Fuller | June 15, 1948 |
| 2,470,405 | Leland | May 17, 1949 |
| 2,493,483 | Francis et al. | Jan. 3, 1950 |

OTHER REFERENCES

Atlas Surface Active Agents, Atlas Power Co., p. 15, copyright 1948.